May 22, 1962     A. O. LUNING     3,035,454
ANTIBACKLASH GEAR Filed June 1, 1960     2 Sheets-Sheet 1

INVENTOR
Alfred O. Luning

ATTORNEY

United States Patent Office 3,035,454
Patented May 22, 1962

3,035,454
ANTIBACKLASH GEAR
Alfred O. Luning, 2611 8th St., Arlington, Va.
Filed June 1, 1960, Ser. No. 33,342
43 Claims. (Cl. 74—440)

This invention relates to antibacklash gears. More particularly it relates to antibacklash gears wherein a plurality of component gears are positioned one adjacent the other face-to-face on a hub, said hub being adaptable to securement to a shaft for rotation therewith. The component gears comprising the antibacklash gear are matched in that they have the same pitch diameters and similar tooth form wherein they may be enmeshed simultaneously with another gear to cooperate therewith as when the anti-backlash gear is interposed for use in a gear train. Also, the component gears and the hub have a common axis which is the axis of rotation of the antibacklash gear. The principle of operation of the gear of this invention resides in producing by spring means a torque mutually opposed between the component gear elements of the antibacklash gear wherein the gear elements tend to rotate in opposite directions relative to each other, the action being such that in operation the teeth of the gear elements move in scissorlike manner against opposite teeth of a gear enmeshed with them. A salient feature of this invention is the use of cantilever springs to produce the torque between the component gear elements of the gear assembly.

This invention is related to Patent 2,966,806 of the inventor (Antibacklash Gear) employing basic principles similar to those revealed and claimed herein but wherein the antibacklash gear is adaptable to simultaneous enmeshment with two conventional gears in contradistinction to one conventional gear as illustrated herein.

A chief object of this invention is to provide an antibacklash gear in which the aforementioned opposing torque is produced between the matched component gears in a unique manner such that there arises no extraneous force in an axial direction upon them, which force would urge the gears apart or urge them together when in operation producing thereby undesirable extraneous friction between the component gears from rubbing together, and which friction must be overcome by the springs whose principal function is to produce torque to transmit gear loads.

Another object of this invention is to provide an antibacklash gear in which the torsional spring rate of the gear is adaptable to adjustment both before and after assembly of the gear in a train, said adjustment being readily effectable precluding the need to disassemble parts of the gear or to remove the gear from the train.

Another object of this invention is to provide an antibacklash gear assembly wherein the springs employed to produce the opposing torque between the matched gear elements of the assembly remain intact in the gear whether the springs are engaged to produce the torque, or are disengaged.

Still another object of this invention is to produce an antibacklash gear assembly in which there is available on the gear different sizes of springs that by virtue thereof choice may be made in the engagement of particular springs to produce between the matched component gears the torque most desirable to meet an application, thus rendering the antibacklash gear adaptable for use to transmit a far greater number of different loads than is possible with other types of antibacklash gears.

A further object of this invention is to provide an antibacklash gear in which the pair of matched gear elements comprising it are capable of being torque-loaded by the springs in either the clockwise or the counterclockwise directions thereby affording means to double the life of both the gear elements comprising the antibacklash gear and a nonbacklash gear in mesh with them, respecting their life torque loaded in either one of said directions.

Other objects of the invention will be understood from the following description of the gear assembly and from drawings accompanying the specification.

With common types of antibacklash gears in use today the gear assembly comprises substantially a pair of matched component gears positioned face-to-face on a hub, the gears being rotatable relative to one another. Holes or matched slots are cut into the faces of the gears in which are placed coiled tension springs or coiled compression springs. When the gear is properly assembled in a train, the springs in them are stretched or compressed, as the case may be, to set up an opposing torque between the pair of matched gears. This torque is created in such fashion that one of the component gears tends to rotate in one direction respecting its axis while the other tends to rotate in the opposite direction. But in producing the aforementioned torque the coil springs, due to their oblique, angular position in the matched slots, also produce undesirable forces against the gears in the axial direction causing the gears to pull apart or to come together. These axial forces, in operation of the antibacklash gear, create substantial friction which must be overcome by the springs in addition to their prime function to produce and sustain between the matched gears sufficient opposing torque to transmit loads incident upon the gear.

Experience has shown that the effort to overcome this friction is appreciable relative to the actual torque produced by the springs, the two being proportional. And experience has shown that in most antibacklash gear applications in which a delicate torque balance between the gears is essential, that rubbing friction between them, introduced by spring forces that pull the gears together or push them apart, is frequently so excessive that the gear fails altogether to function in its antibacklash capacity. Thus, excessive friction from rubbing of the gears brought about by the springs will defeat the purpose of the gear which is to eliminate backlash in the gear train when the direction of rotation is reversed.

If stronger coil springs are resorted to in a particular application to overcome the aforementioned friction, then greater torque is created between the matched gears, which increase creates a concomitant increase in friction between the teeth of the component gears as they work in unison against mating teeth of the gear in the train in mesh with them. To overcome the increased friction thus arising at the teeth, the driving effort or input of the gear train must be increased.

Another undesirable result accruing in antibacklash gears using obliquely-positioned springs that cause rubbing of the matched gear elements is that the opposing torque created, must always be greater than the load to transmit the load, thus increasing wear of the teeth on both component gear elements of the antibacklash gear and the gear with which they are engaged.

In still other types of antibacklash gears in use an opposing torque is established between a pair of matched gear elements by springs having ends hooked over and inserted into holes in the matched gears. The hooked ends of these springs will always twist out of alignment and distort in setting up their adjustment so that they too, like coil springs, exert axial force components on the component gears forcing them to rub together reducing the efficiency of the assembly in a manner similar to that with coil springs.

The antibacklash gear of this invention employs simple, cantilevered wire springs coacting with projections on the gear face which combination overcomes the aforementioned shortcomings and undesirable features of antibacklash gears in common use employing coil and hooked end springs. In addition, the gear of this invention opens new horizons in the field suggesting innumerable possibilities relative to the number and arrangement in which springs of the cantilever type may be advantageously employed in the gear.

The cantilever springs described and used in this invention to produce an opposing torque between the matched gears of the antibacklash gear assembly, furthermore, may be made from a variety of metals, alloys, plastics and other materials considered brittle. The aforementioned materials need not be restricted for instance to especially treated wire, bar or strip manufactured expressly for spring applications to withstand severe deformation as when forming coils because the spring elements of this invention need undergo but small displacement to produce the torque required for operation of the gear.

The invention described herein, using straight cantilever springs projecting radially from the hub portion of the gear, introduces pure torque between the matched pair of gears; that is to say, the springs in producing torque between the gears create no axial force deleterious to operation of the gear as hereinbefore explained. Because of the absence of axial forces upon the gears causing them to rub in operation, there will be an absence of friction associated therewith such that the torque required between the matched gears can be closely and accurately attuned to match gear loads transmitted. This in turn prolongs the life of all gears engaged due to less wear from lighter loads incident upon the teeth. Moreover, the torque or power necessary to drive a gear train employing the antibacklash gear of this invention will be proportionately reduced because of the lighter spring loading to which the gear may be adjusted when axial friction loads are absent. That is, in the latter instance, there will exist less tooth-to-tooth friction, and wear, between the antibacklash gear and the gear with which it is engaged, due to the fact that the teeth of the matched gears of the antibacklash gear produce, in operation, less pressure against the teeth on the engaged conventional gear.

Another feature of this invention is that adjustments or variations of the torque exerted between the pair of matched gears can be readily achieved by forcibly bending back the spring elements beyond their elastic limit that by such deformation a new, different force be exerted against the mating pin projections when the gear is engaged. This method of effecting a change in the torsional spring rate between the gears has much merit. Consider that, after assembly in a gear train, it is desired to change the force between the matched gears to accommodate a greater or lesser load incident upon the train. Disassembly of the antibacklash gear to reset the engaged teeth to take a new load might not be at all feasible, it can be appreciated. At best, considerable effort, time and expense might be entailed in such disassembly, depending upon the construction and accessibility of the mechanism using the gear. Thus, the antibacklash gear of this invention obviates the necessity for disassembly from an enmeshed gear to effect a change in the torsional spring rate through its spring elements.

A brief description of the drawings is given as follows:

FIGS. 1 and 2 illustrate the preferred embodiment of this invention.

Figures 1, 2, 3, 4, 5, 6, 7:
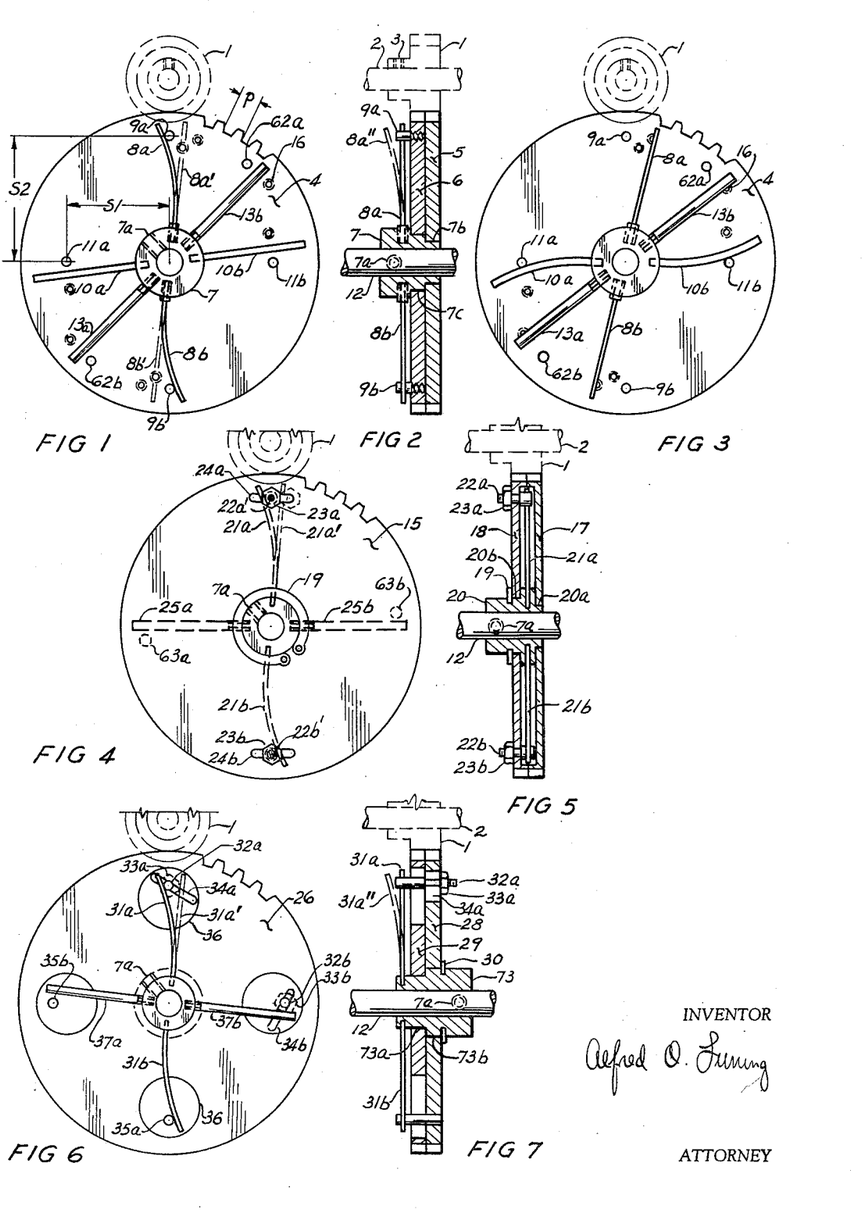
FIG. 1 is an elevation view of one embodiment of the gear of this invention.
FIG. 2 is a sectional view of FIG. 1.
FIG. 3 is a second elevation view of the gear of FIG. 1 showing the gear in an alternate position.
FIG. 4 is an elevation of a second embodiment of this invention.
FIG. 5 is a sectional view of FIG. 4.
FIG. 6 is an elevation of a third embodiment of the gear of this invention.
FIG. 7 is a sectional view of FIG. 6.

A detailed description of the drawings is as follows:

In FIG. 1, and in FIG. 2 a sectional view of FIG. 1, part 1 is a conventional spur gear shown in phantom outline in mesh with antibacklash gear assembly 4, the first embodiment of the invention.

Gear 1 is secured to shaft 2 by setscrew 3 radially placed in the hub member of 1. Gear 1 is engaged in like manner with all embodiments of the invention. Gear assembly 4 comprises a pair of matched gears, 5 and 6, each having the same pitch diameter and tooth form to simultaneously engage gear 1, the combined tooth widths of 5 and 6 being equal substantially to the tooth width of 1 as shown in FIG. 2. Gears 5 and 6 are also shown of approximately equal width. Gear 5 has a hole in its center through which it is securely assembled to hub 7 at step 7b. Gear 6 also has a hole in its center through which it is rotatably mounted on 7 and secured from axial movement by 5 and the left end of step 7c. Gears 5 and 6, and hub 7 all have a common axis of rotation which is the axis of rotation of shaft 12; and in all subsequent embodiments of the invention the component gears, the hub member and the shaft likewise have a common axis of rotation.

Hub 7 is secured to shaft 12 by setscrew 7a. Affixed to 7, and projecting radially therefrom are cantilevered round wire springs 8a, 8b, 10a, 10b, 13a and 13b arranged in oppositely disposed pairs having different sizes and lying substantially in one plane around the hub member normal to the axis of rotation. Six similar projections in the form of pins 9a, 9b, 11a, and 11b, 62a and 62b threaded at one end are secured in tapped holes to 6 normal to the side thereof to engage the springs. Eight additional tapped holes 16 in 6 are provided to permit repositioning the pins and/or adding new pins to effect other combinations of spring engagement that thereby the gear assembly be uniquely adapted to transmit a very wide range of loads thus substantially increasing its usefulness and utility.

In FIG. 1, springs 8a and 8b, oppositely disposed, are of the same size and are shown deflected in coacting engagement with oppositely disposed pins 9a and 9b such that each spring exerts an equal force against the pin engaging it. Alternate disengaged positions assumed by the springs are shown in outline as 8a' and 8b'.

The action of the springs against the pins is such that an opposing torque is set up between matched gears 5 and 6 in which gear 6 tends to rotate in the clockwise direction and gear 5, with hub 7, tends to rotate in the opposite, counterclockwise direction. But the antibacklash assembly 4, as shown in mesh with 1, is in stable equilbrium. When the gear train is in motion and gear 1 is rotated, for example, in the clockwise direction, the antibacklash gear assembly 4, as shown, will rotate in the counterclockwise direction by virtue of driving contact between the teeth of gear 1 and gear 6. And when gear 1 of the train is rotated in the reverse, counterclockwise direction, the antibacklash gear will rotate in the opposite, clockwise direction, by virtue of driving contact between the teeth of gear 1 and gear 5. From the aforegoing it may be seen that when gear 1 of the train is in motion in either direction, it drives the antibacklash gear by but one of the pair of matched gears 5 and 6 comprising it, depending upon the direction of motion and the initial direction in which the opposing spring torque is produced relative to the component gears.

It may also be seen from FIG. 2, and the explanation given of the functioning of gear assembly 4 engaging gear 1 that in the direction which gear 1 is turned to transmit train loads, tooth contact with gear 4 is properly made such that one half of the face only of each tooth on gear 1 transmits the load. And when the direction is reversed in which gear 1 is turned, that half of the face only of each tooth opposite the former transmits the load. It may be seen further, from symmetry of the oppositely disposed springs and coacting pins in FIG. 1, that engagement of springs 8a and 8b with pins 9a and 9b, respectively, may occur also that the springs coact with the opposite sides of the pins thereby reversing the direction of the torque produced between the matched gears.

From this fact it may been that when the teeth of gears 1, 5, and 6 become worn or damaged in operation, in which the springs and pins have been continuously engaged to spring load the gears in the same direction, that the life of all gears enmeshed can be doubled by the simple expedient of reversing the direction in which the springs are engaged thereby counter setting the contact of all teeth in mesh wherein new engagement is made with the remaining unworn portions of the tooth lands. Thus, the life of the gears may be doubled relative to their life when spring loaded in one direction only. This feature is a salient one of the invention and is inherent in all the embodiments thereof.

So long as the springs are deflected a sufficient amount that the resultant opposing torque produced between the pair of matched gears is equal to or greater than the driven load, including the torque necessary to overcome friction at the teeth of gears 1, 5, and 6 as they move together, and any other friction inherent in 4, the antibacklash gear assembly will function properly as intended and described. If, however, the springs are too lightly deflected upon engagement that the resultant opposing torque produced between gears 5 and 6 is too small, then the antibacklash gear will cease to function in its antibacklash capacity. That is to say, in either direction of rotation of the train, if too little spring torque is created between gears 5 and 6, gear 1 will always transmit the load to gear assembly 4 through gear 5 only, the gear which is securely fastened to the hub; rotatable gear 6 thus becomes useless, and the antibacklash feature disappears.

On the other hand, if the springs are deflected more than necessary for a particular application in a train, and produce thereby on rotatably mounted gear 6 a torque greater than required to transmit the load then, though the antibacklash gear still functions properly, there arises excessive friction and excessive wear of all teeth on gears 1, 5 and 6. That such friction and wear can be appreciable and damaging may be understood from the fact that when gear 1 rotates in a direction such that hub-secured gear 5 transmits the load, the actual pressure exerted between the teeth of gear 5 and gear 1 is at least twice the pressure that would exist if antibacklash gear 4 were instead a simple spur gear like gear 1. This phenomenon is singular of all antibacklash gears comprising a pair of matched gears which simultaneously engage another gear, and is attributed to the fact that the spring loading of the matched pair of gears, whether they be in operation or not, must be sufficiently great that the rotatably mounted gear of the pair has sufficient spring torque exerted upon it to transmit the load of the train in the opposite direction when rotation of the train is reversed.

As a consequence of the double load pressure incident upon the teeth of gear 5, and that portion of the teeth of gear 1 in mesh with 5, there arises double friction and wear on the mating surfaces of the teeth of these gears when transmitting loads. Therefore, to equalize pressure and wear upon the teeth of all the gears 1, 5 and 6, it can be seen from the aforegoing that the width of hub-secured gear 5 should always be greater than the width of rotatable mounted gear 6. However, to simplify the construction, gears 5 and 6 are shown of equal width.

In all antibacklash gears employing springs coacting between a pair of matched gears simultaneously engageable with a conventional spur gear or single gear with one row of teeth such as the gear of this invention, the increments in which the opposing torque can be adjusted between the matched gears is directly related to the pitch of the gear teeth. In FIG. 1 the tooth pitch for all the gears is $p$. Since the teeth on gears 5 and 6 must be substantially in alignment to allow them to mesh together in unison with gear 1, it is apparent that the basic increments which springs 8a and 8b can be deflected, and the resultant torque changed, are multiples of pitch $p$. It follows that the smaller the pitch the greater will be the number of torque adjustments possible within the elastic limit of the springs. With virtually all antibacklash gears in common use the above means of torque adjustment by varying the alignment of the teeth of the matched component gears is significantly the only means possible.

With the antibacklash gear of this invention, however, the increments by which the opposing torque can be varied is virtually infinite. For example, spring 8a can be disengaged to position 8a' by deflecting it outward and around the free end to the opposite side of pin 9a as shown in position 8a'', FIG. 2. In this manner spring 8b alone, coacting with pin 9b, could be utilized to reduce the opposing torque by half its value; moreover, the engagement and disengagement of all springs on the gear may be effected in like manner, and at all increments of pitch $p$ to which the matched gears 5 and 6 are adjustable; i.e., where the springs and pins are situated close enough together to be engaged.

Springs 10a and 10b are similar but larger in size than springs 8a and 8b in order to provide, when engaged, greater torque loadings of the gear assembly for transmission of larger gear loads. Similarly, springs 13a and 13b are identical and larger than springs 10a and 10b. Also, the springs provided make possible a greater range of torque adjustments when used in combination.

Springs 10a and 10b are shown near pins 11a and 11b respectively; they may be simply engaged with the pins, singly or jointly in the manner shown of 8a''. Thus, one, two, three, and four springs can be engaged, and these in six combinations all different.

Pins 8a and 8b are a distance S2 from the centerline of the gear, and pins 11a and 11b are a distance S1 closer to the centerline. These pairs of pins are differently located from the centerline of the gear to provide another means to vary the torsional spring rate of the gear assembly wherein the springs may be interchangeably engaged with the pins, and engaged at different points of their lengths.

Eight additional tapped holes 16 in 6 are provided to increase the utility of the antibacklash gear by allowing placement of additional pins 9a in 6 that all six springs may be engaged singly and in combination. Also, the additional holes will accommodate the existing pins in a new location by transfer to engage, when desired, different springs either singly or in combination to vary the torque. From the relative location of all the pins and holes near the springs it may be seen, furthermore, that the aforegoing utility is present in the gear for either clockwise or counterclockwise directions in which the springs are engaged, and to effect change in direction of the torque after enmeshment of the gear with another gear.

Springs 8a, 8b, 13a and 13b are threaded at one end and secured in tapped holes in hub member 7, thus providing a means to effect detachment of the springs should they not be used, or should they become damaged and require replacement. Springs 10a and 10b are fixedly secured in hub member 7.

Figure 14:
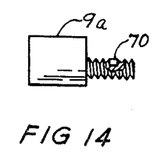
FIGS. 14 and 15, respectively, are an elevation and end view of member 9a of FIG. 1.
Figure 15:
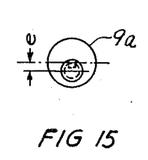

FIGS. 14 and 15 show respectively an enlarged elevation and end view of pin 9a. The right end of 9a is threaded to accommodate to gear 6; the left end is cylindrical and is the portion of the pin that engages the springs of the gear. The axis of the threaded end is eccentric off center from the axis of the cylindrical end that thereby a cam action is achievable in cooperation with the springs when the pin is inserted in gear 6. To sustain 9a in any desired angular position in 6, the feature of the common Nylock screw is employed to introduce friction between the screw threads that the pin remain in an angular position desired in the gear. In the Nylock screw a cylindrical nylon pellet 70 is inserted radially in the screw threads as shown and serves to lock the screw in any angular position to which it is left when screwed in the side of the gear. With cam action created by eccentricity of the axes of the two portions of the pin, pin 9a, upon insertion in gear 6 may be rotated any degree and sustained in position by friction of pellet 70 made of nylon, against the mating threads. Thus in engagement with the cantilevered springs of the antibacklash gear, pins 9a, by virtue of their cam action afford means to closely adjust and change the torque produced between the component gears of the antibacklash gear assembly, and afford means also to adjust the torque and change it in virtually an infinite number of increments as may be seen. Moreover angular adjustment of 9a in 6 can be achieved prior to and after assembly of the antibacklash gear in a gear train. It is to be appreciated furthermore since pitch $p$ of FIG. 1 is the smallest increment of adjustment between 5 and 6, as hereinbefore explained, that the ideal smallest eccentricity $e$ of the two offset centerlines of 9a would be approximately one half of $p$ or $p/2$. By an eccentricity of this amount it may be seen that pin 9a, in one revolution would effect a change in the torque between the component gears equivalent to that produced when gears 5 and 6 are removed from 1 and angularly displaced a single tooth increment $p$ relative one to the other. Also, it is to be appreciated that eccentricity $e$ may be of such magnitude that in one complete turn of 9a a change of torque is effected between 5 and 6 equivalent to tooth displacements $2p$, $2\frac{1}{2}p$, $3p$, etc.

The principle of the Nylock screw applied to 9a, while an effective means to sustain 9a in 6 in various angular positions relative to the tapped holes 16, is but one means of many that may be resorted to to accomplish this. Another method could be simply an interference fit between the male and female threaded members of pin and hole.

FIG. 3 shows how the antibacklash gear of FIG. 1 would appear in an alternate position with just springs 10a and 10b employed against pins 11a and 11b respectively. It is possible, in the manner shown with 8a'', to disengage spring 10a or 10b from its coacting pin and decrease by one half the torque produced by the springs together. Also, it may be seen that springs 13a and 13b can be brought into and out of engagement in like manner to that shown for position 8a'' when pins are inserted in holes 16 nearest them; and similarly for springs 8a and 8b in their new positions shown in FIG. 3.

Another means to vary the opposing torque produced between the matched component gears by the springs is by forcibly bending them back beyond their elastic limit in a direction perpendicular to the axis of the gear so that they are slightly deformed thereby and exert a changed force against the pins when released against them in engagement therewith.

It may be seen that the springs of FIGS. 1, 2, and 3 are exposed and accessible outside of the matched gears and by virtue of this are adaptable to be engaged, disengaged, and deformed as described herein both prior to and after assembly of the gear in a train. This adaptability is a useful and salient feature of this invention facilitating assembly and removal of the antibacklash gear in a gear train and allowing fine adjustments of the spring torque between the matched gears.

FIG. 4 illustrates a second embodiment 15 of the gear of this invention. FIG. 5 is a sectional view of FIG. 4. The principle of operation of this embodiment and all subsequent embodiments shown is identical to that of the embodiment of FIGS. 1, 2, and 3, and principal parts are basically and substantially of the same nature.

In FIG. 4, antibacklash gear assembly 15 is shown in mesh with gear 1 on shaft 2. Gear 15 is secured to shaft 12 by set screw 7a in hub 20. Gears 17 and 18 are the pair of matched component gears comprising 15 that engage 1. Gear 17 has a hole in its center through which it is firmly attached to hub 20 at step 20a. Gear 18 has a hole in its center through which it is rotatably mounted on 20 at step 20b, being secured from axial movement thereon by retaining ring 19. Cantilever springs 21a, 21b, 25a and 25b are secured to hub 20 and radiate therefrom in the protective recess formed between 17 and 18. Springs 21a and 21b, oppositely disposed, are shown coacting respectively with adjustable pins 22a and 22b in 18, which pins are threaded at one end and secured in slots 24a and 24b in 18 by means of nuts 23a and 23b respectively. The end of the pins engaging the springs between the gears is enlarged to prevent the pins from passing through the slots when drawn up by the nuts. Screwdriver slots 22a' and 22b' are placed in the threaded ends of pins 22a and 22b to facilitate adjusting the pins in conjunction with tightening and releasing the nuts should pin and nut bind and turn together in tightening or loosening them.

Slots 24a and 24b are tangentially positioned and oppositely-disposed at the outer peripheral portion of 18. The slots permit adjusting the pins in large or in infinitely small increments which, in turn, provides means to vary in large or in infinitely small amounts the opposing torque between 17 and 18 produced by either pair of the four springs; this means of adjustment is in addition to the means possible of varying the torque by basic pitch adjustments $p$ as explained in embodiment FIGS. 1 and 2.

To illustrate the possibility of disengaging a spring without disassembling the antibacklash gear or removing it from the train, spring 21a is shown in phantom outline 21a' as it would appear disengaged from pin 22a when the pin is positioned at the right end of slot 24a. The slots also afford peepholes wherein engagement of pins and concealed springs can be visually ascertained from outside the gear. Springs 25a and 25b are larger in diameter than springs 21a and 21b and are stronger; these are extra springs provided to cooperate with pins 22a and 22b to increase the utility of the gear that it be capable of transmitting greater loads than smaller springs 21a and 21b are capable of sustaining. Springs 25a and 25b are threaded at one end and secured in tapped holes in hub member 20 thus providing a means to effect their detachment and replacement. Springs 21a and 21b are fixedly secured in 20. Members 63a and 63b are cylindrical pins fixed diametrically opposite in 18 and located close to 25a and 25b that 25a and 25b may be respectively engaged therewith independently and in combination engagement with 21a or 21b, or with pins 22a and 22b.

FIG. 6 is a third embodiment of the gear of this invention. FIG. 7 is a sectional view of FIG. 6. Gear 1 on shaft 2 is shown in mesh with antibacklash gear assembly 26 secured to shaft 12 by setscrew 7a in hub member 73. The pair of matched component gears are 28 and 29. Gear 29 has a mounting hole in its center through which it is securely fixed to hub 73 at step 73a. Gear 28 has a hole in its center through which it is rotatably mounted on hub 73 at step 73b, being secured from axial movement thereon by retaining ring 30. Springs 31a, 31b, 37a and 37b are radially secured to 73 at the left end thereof, with 31a and 31b shown in coacting engagement against slidably adjustable pin 32a and fixedly secured pin 35a respectively, both pins secured in rotatably mounted gear 28. Pins 32a and 32b are mounted in obliquely-positioned slots 34a and 34b respectively in 28, and are secured in place in the slots by nuts 33a and 33b at their right ends which ends are threaded to accommodate the nuts. The opposite, left ends of 32a and 32b engage the springs and are enlarged as shown to keep the pins from pulling through slots 34a and 34b when tightened in place by the nuts. All four springs shown are accessibly disposed on 73 and may be engaged and disengaged from all pins in manner similar to that illustrated for spring 31a; and this, it may be seen, can be effected without disassembling the antibacklash gear or removing it from the train. That is, 31a may be deflected outward and around pin 32a as shown in alternate position 31a″ and 31a′. In addition, the springs can be engaged and disengaged from adjustable pins 32a and 32b by varying the position of the pin in slots 34a and 34b respectively; this may be accomplished conveniently, as can be seen, without the need to disassemble the antibacklash gear or to remove it from the gear train.

Four access and lightening holes 36 in fixed gear 29 are provided to allow freedom of movement to adjust, through gear 29, the pins protruding from rotatable gear 28 in engagement with the springs. Also, as shown and explained hereinbefore, the slots for adjustable pins 32a and 32b of FIG. 6 allow large and infinitely small adjustments to be made with the slidably adjustable pins in spring loading the antibacklash gear and provides means to adjust closely and in various degrees the opposing torque between the matched gears; this adjustment is possible to the extent that the engaged springs may be deflected the maximum safe distance within their elastic limit, or may be completely disengaged from their respective pins.

Pins 32b and 35b are secured to gear 28 and protrude through access holes 36 in 29 to engage springs 37a and 37b, which springs are larger in diameter and stronger than springs 31a and 31b. Springs 37a and 37b produce a larger torque between the matched component gears when engaged than the latter thereby increasing the utility of the antibacklash gear to transmit a greater range and combination of loads.

As shown in FIG. 6, springs 37a and 37b are not engaged; however, as can be seen, either or both of these springs may be simply and easily engaged by deflecting them outward, around and behind their respective pins 35b and 32b in the manner shown of 8a″ in FIG. 2, and 31a″ in FIG. 7. In like manner either or both of springs 31a and 31b may be engaged, and disengaged. Also, with spring 37b, infinitely small increments of torque adjustment are possible, as with spring 31a, by virtue of adjustable pin 32b. Furthermore, with antibacklash gear assembly 26, basic adjustments to the torque in increments of pitch p are possible as explained for embodiment FIGS. 1 and 2. In summary, it may be seen that the opposing torque-loading combinations of the matched gears of assembly 26, with all pins and springs in a single engageable position total 15 combinations. And with the adjustable feature of the movable pins the torque-loading variations possible with assembly 26 become virtually infinite. Springs 37a and 37b are threaded at one end and secured in tapped holes in hub member 73 thus providing a means to effect detachment of the springs or replacement thereof. Springs 31a and 31b are fixedly secured in hub 73.

Figure 8:
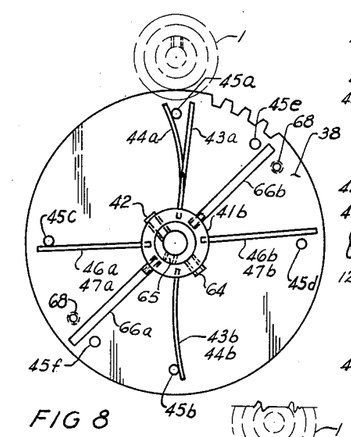
FIG. 8 is an elevation of a fourth embodiment of the gear of this invention.
Figures 9, 10:
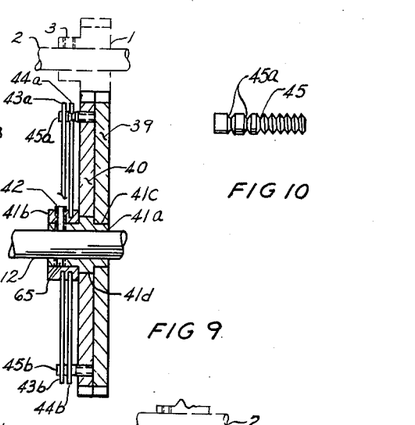
FIG. 9 is a sectional view of FIG. 8.
FIG. 10 is an enlarged view of pin 45 of FIG. 8.

FIG. 8 is an elevation of a 4th embodiment of the gear of this invention. FIG. 9 is a sectional view of FIG. 8. In FIGS. 8 and 9, gear 1 is shown in mesh with antibacklash gear assembly 38, comprised of matched component gears 39 and 40. Gear 39 is secured through a hole in its center to hub member 41a at step 41c. Gear 40 is rotatably mounted through a hole in its center on 41a at step 41d.

The hub member of the gear is identical in configuration to hub 7 of embodiment FIGS. 1 and 2, except that it is formed in two parts 41a and 41b instead of one part 7 as shown in FIG. 2. Hub member 41b is a ring free fitting over 41a; it serves the combined function of securing gear 40 against axial movement on 41a, provides a means to secure all cantilevered springs on 41b, and by virtue of setscrew 42 radially through 41b and 41a provides means to secure 41b to 41a, and 41a to shaft 12. The cantilever springs 43a, 43b, 44a, 44b, 46a, 46b, 47a and 47b of gear assembly 38 are secured at one end thereof to 41b and radiate outward side-by-side in substantially parallel pairs to engage pins 45a, 45b, 45c and 45d which pins are threaded at one end and screwed into tapped holes 68 in 40 protruding therefrom in an outward, axial direction. By arranging the springs in parallel pairs as shown, it is possible to engage and to disengage either or both springs from their respective pin by deflecting them outward and around the pin in manner similar to 8a″ of FIGS. 1 and 2. FIG. 10 is an enlarged view of pin 45 wherein two parallel grooves 45a are provided at one end to guide and nest the springs in parallel alignment.

As shown in FIGS. 8 and 9, spring 44a is engaged with pin 45a while neighboring spring 43a is disengaged from 45a. Also, oppositely disposed parallel springs 43b and 44b are both engaged with 45b. The arrangement of springs 43a, 44a, 43b, 44b, 46a, 47a, 46b, 47b and pins 45a, 45b, 45c, and 45d in FIG. 8 is intended to show that each parallel pair of springs engages its respective pin in series. In setting up engagement of the springs by rotating matched gears 39 and 40 in opposite directions, the first pair of springs to be deflected are 43a and 44a by contact with pin 45a; next to be deflected are springs 43b and 44b by pin 45b which is illustrated by less curvature in their bends. Springs 46a and 47a are shown on the point of engagement with pin 45c and actively engage next; finally springs 46b and 47b, shown a short distance away from pin 45b will come into engagement. With these eight springs the possibility of making variations to the torque between the pair of matched gears, in addition to basic torque variations possible with pitch increments p, previously explained for embodiment FIG. 1, are numerous. For instance, with the eight springs discussed in the assembly of FIG. 8, when the matched component gears are rotated counter to each other sufficiently that all eight springs and the four neighboring pins are engaged, each pair of springs will be deflected a different amount so that by virtue of this a different force is exerted by each pair. It may be seen that by alternately disengaging the springs only by neighboring pairs, singly, and in combination with other pairs, the torque variations possible combine to 15. Again by alternately disengaging a single spring of each pair, and by disengaging it in combination with all other springs the torque variations possible combine to 127. Though all of the eight small springs shown are of the same size, it can be appreciated that were each spring of a pair of different size the torque variations possible would then sum to 255. Thus the engagement of any single spring with a pin, where the force exerted upon the pin by the spring is a force different from the forces exerted by other engaged springs and pins makes possible a variety of new torque combinations.

Also in FIG. 8, it may be seen that if each of the ten springs shown exerted a different force when engaged with its pin either by virtue of all springs being of different size, or by virtue of all springs making contact with the pins at different points of their length, or by virtue of slight misalignment of the pins as shown that the springs do engage the pins at different angles of displacement between the matched gears, then the torque variations possible, by virtue of the different engageable combinations, would be 1023 different combinations.

In addition to the aforedescribed ways of varying the torsional spring rate between the pair of matched gears, there exists also the possibility to deform, that is, overbend the springs in a plane perpendicular to the axis of the gear to increase or to decrease the force exerted by them upon the pins. A pair of larger and stronger cantilever springs 66a and 66b are provided on 41b to increase the range of transmissible loads possible with the antibacklash gear assembly. These springs are engageable with pins 45e and 45f which pins are threaded at one end and screwed into gear 40. Tapped holes 68 in 40 are provided to accommodate cylindrical pins 45e and 45f or pins similar thereto in order to enable spring loading the gears in an opposite rotational direction. Springs 66a and 66b are threaded at one end as shown to fit into tapped holes in 41b to facilitate installation and removal from the gear assembly.

The gear assembly of FIG. 8 has the additional feature that various rings of spring assemblies 41b may be separately supplied and stocked independently of the gear itself, wherein not only different size springs may be employed, but springs arranged in innumerable other combinations as well. Therefore, the embodiment of FIG. 8, having a detachable ring of radiating springs forming a detachable portion of the hub, provides still further means, by virtue thereof, to vary the opposing torque between the matched gears of the assembly, and increases further thereby the utility and usefulness of the gear. To permit angular positioning of 41b on 41a independently of the securement of 41a to shaft 12, setscrew 64 is provided radially in 41b to secure it to 41a; and setscrew 65 is provided in 41a to secure the entire gear assembly to shaft 12.

In FIG. 9 it may be seen that rotatably-mounted gear 40 is readily detachable from hub member 41a when ring 41b is removed. This detachable feature allows ready replacement of gear 40 should it become damaged or worn and also permits 40 to be replaced with a similar gear having pins differently located to engage springs on another matching ring portion 41b which has a changed arrangement of the springs. Springs 43a, 44a, 43b, 44b, 46a, 47a, 46b and 47b lie substantially in two parallel planes normal to the axis of the gears.

Figure 11:
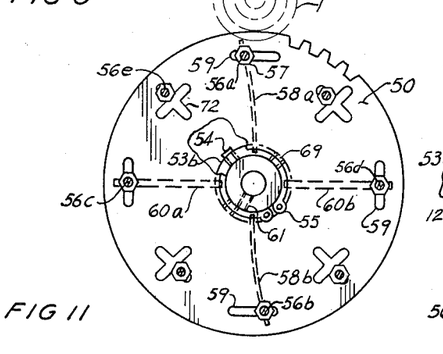
FIG. 11 is an elevation of a fifth embodiment of the gear of this invention.
Figures 12, 13:
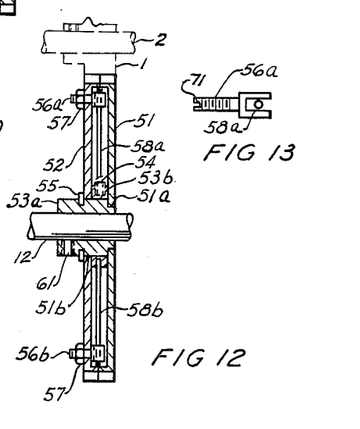
FIG. 12 is a sectional view of FIG. 11.
FIG. 13 is an enlarged view of forked pin 56a of FIG. 12.

FIG. 11 is an elevation of a fifth embodiment of the gear of this invention. FIG. 12 is a sectional view of FIG. 11. In the figures gear 1 is attached to shaft 2, and is in mesh with antibacklash gear assembly 50 comprising the pair of matched gears 51 and 52. Gear 51 is fixedly secured through a hole in its center to hub portion 53a at circular step 51a. Gear 52 is rotatably-mounted through a hole in its center on 53a at step 51b, and is secured from axial movement on the hub by retaining ring 55. The hub of the gear is identical in configuration to hub 20 of the second gear embodiment FIGS. 4 and 5, with the exception that the hub is formed in two parts 53a and 53b instead of one part 20 as shown in FIG. 5. Hub member 53b is a free-fitting ring over 53a which ring serves to space gears 51 and 52 at the hub, and to secure the cantilever springs 58a, 58b, 60a, and 60b at one of their ends thereof, within the recess formed between the gears. Ring 53b is secured to 53a by radially-placed setscrew 54 shown in the broken-out section of FIG. 11. The entire gear assembly 50 is secured to shaft 12 by radially-placed setscrew 61 in 53a. The four springs shown engage identical projections in the form of pins 56a, 56b, 56c and 56d secured, for adjusting purposes, in four slots 59 tangentially placed in rotatable gear 52.

FIG. 13 is an enlarged view of pin 56a as it would appear looking down from the top; the pin is threaded at one end to engage nut 57 by which it is secured to gear 52. A screwdriver slot 71 is in the threaded end of 56a to facilitate tightening and loosening it on the gear in conjunction with nut 57. As illustrated, pin 56 has a division in the form of forks at one end to allow spring engagement in two directions against the inside faces of the divided portions. A spring 58a is shown between the forks to show how the spring nests between them in assembly. The purpose of the forks is to allow engagement with each spring on two opposite sides thereof, that with the pins adaptable to adjustment in either left or right directions in slots 59, an opposing torque can be produced both clockwise and counterclockwise between the matched gears. With reference to the explanation given hereinbefore of embodiment FIGS. 1 and 2 relative to the direction of gear rotation, tooth operation, and contact and wear of all gears in mesh, it can be seen that the feature of adjustable forked pins, by affording means to produce the opposing torque in two directions, also affords means to double the life of the gears 1, 51 and 52 in mesh, by providing means to bring into active contact the whole width of both lands of each tooth of the enmeshed gears. That is to say, if the springs are deflected always in the same direction to produce the opposing torque between the pair of matched gears, then in time when the engaged portions of the tooth lands have become worn from use the springs may be newly set to deflect in the opposite direction reversing the torque thereby and causing the heretofore unengaged portions of the tooth lands to make working contact with each other that tooth action commence again as in the original, new state.

As shown in FIG. 11, springs 58a and 58b are in coacting engagement with pins 56a and 56b. Springs 60a and 60b are larger and stronger springs than 58a and 58b and, in engagement with pins 56c and 56d, increase the utility of the gear that it be adaptable to transmit greater loads with a wider range of adjustments. Springs 60a and 60b are shown straight in the unloaded condition, with pins 56c and 56d centrally located in slots 59. It may be seen that the springs and pins of gear embodiment 50 are adaptable to be engaged and disengaged individually and in combination to produce a multitude of different opposing torques, and that minute changes in the torques produced may be readily and simply achieved by making small adjustments to the position of the pins. In member 54 are two setscrews 69 to accommodate two additional springs threaded at one end like springs 66a and 66b of FIG. 8 that they may be engaged with pins 56e to increase the load capacity of the antibacklash gear assembly.

Gear 52 and 53b, like gear 40, and ring 41b respectively of embodiment FIG. 9, may be readily disassembled from other parts of the gear assembly, as may be seen; and the same advantages hereinbefore explained respecting replacement of these members for the latter embodiment apply likewise to the former.

An arrangement of four crossed slots 72 are placed in 52 to accommodate additional pins 56e similar to 56a. Theses lots are placed in both the radial and tangential directions that pins 56e may be adjusted both radially and tangentially to effect torque changes and adjustments with springs engaging them. Hub member 53b may be angularly oriented on 53a that the four springs thereon come into engagement with the four pins 56e in the crossed slots, or another hub member similar to 53b with eight springs radiating from it in similar fashion to the four shown may be used in place of 53b wherein all eight springs are engageable with the eight pin members provided. It may be seen that an infinite number of different torque loadings is possible with the springs when the pins are adjustable of position in the face of the rotatably mounted matched gear.

From the aforegoing description in this specification, and from the accompanying drawings appertaining thereto the following summary is given relative to general salient features and novelty of the invention:

All embodiments of the invention employ cantilever springs affixed at one end to a hub member, the springs being engageable in entirety, in part and in combination with projections in the form of pins extending from the sides of the rotatably mounted component gear of the embodiments; the springs and cooperating pins in all embodiments are adaptable to be engaged and disengaged independently; the springs and cooperating pins in all embodiments are adaptable to be engaged to produce a torque between the matched component gears of the antibacklash gear in both the clockwise, and the counter clockwise directions; all springs are adaptable to engagement with the cooperating pins at two surfaces substantially opposite thereon; all embodiments contain springs and pins that are removable and replaceable in the antibacklash gear; all embodiments contain springs fixedly secured to the hub of the embodiments; in all embodiments it is possible to effect in entirety the engagement of all mating surfaces of the teeth of the antibacklash gear and also the teeth of a gear enmeshed therewith; the springs and cooperating pins in all embodiments are adaptable to be engaged, disengaged, and adjusted prior to and after enmeshment of the antibacklash gear with another gear; for purposes of engagement, disengagement and adjustment prior to and after enmeshment of the antibacklash gear with another gear, the springs and cooperating pins in all embodiments are accessibly disposed; all embodiments employ removable pins in the rotatably mounted component gear of the antibacklash gear assembly which pins are adaptable to change of location thereon and permit changing the direction of engagement of springs and pins, and the direction of the torque between the matched gears precluding the need to remove the antibacklash gear from prior enmeshment with another gear; all embodiments employ springs of different sizes and strengths to increase the load range, and number of different torque settings possible with the antibacklash gear wherein springs and cooperable projections may be engaged singly and in combination; all embodiments employ cantilever springs and cooperable pin projections which, in engagement, disengagement and adjustment need not be disconnected or removed from the antibacklash gear, and which therein preclude the need to disassemble the antibacklash gear; all embodiments employ springs and pins, the engagement of which can be reversed in direction to change the direction of the spring torque produced between the matched gears, wherein reversal of engagement can be achieved after assembly of the antibacklash gear with another gear, while precluding the need therein to disassemble the antibacklash gear or to remove it from enmeshment with said other gear; all embodiments employ cantilever springs which are adaptable to be removed, relocated or replaced by similar springs having the same or different spring characteristics; the springs of all embodiments radiate outward from the hub member normal to the axis of the matched component gears or substantially so; the spring-cooperating projections from the rotatably mounted matched gears extend outward from the face of the gears parallel to the common axis of the matched component gears in the various embodiments wherein the springs engage the projections normal to the sides thereof; the springs and cooperating pins have a preferred circular cross-section; the springs radiate from the hub member in one or more planes normal to the common axis of the matched gears, or substantially so; all embodiments contain springs engaged with cooperating projections, and all embodiments contain springs and projections that are not engaged wherein, in the latter instance, the springs not engaged may be considered additional springs or spares which spares are both removable from the gear assembly and addable thereto by virtue of screw means at one end thereof and tapped holes mating therewith in the gear hub; in all embodiments the force exerted by the springs may be changed by the simple expedient of forcibly deflecting the springs beyond their elastic limit that they exert against the cooperating pins a new force thereby; in the various embodiments all the springs are preferably arranged in pairs oppositely disposed around the hub of the gear, each pair having size, and spring rate different from another pair; springs in all embodiments when not engaged can be brought into engagement by deforming them if necessary to bring them into engagement with the pin projections, and when engaged the springs can be brought out of engagement with the pins by deforming them away from the pins; where desired large springs or primary springs may be employed to transmit the major portion of gear loads incident upon the antibacklash gear and small secondary springs may be employed appropriately to attune or adjust closely the sensitivity of the load to optimum torques required in an application.

I claim:

1. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, said spring means comprising a plurality of springs having different characteristics, said spring means adaptable to engagement and to disengagement in entirety and in part with said projections.

2. An antibacklash gear assembly as claimed in claim 1 wherein said projections and said spring means are removable and replaceable in said antibacklash gear assembly in the same and in different locations thereon wherein means is provided in said cooperation thereof to effect changes in said torque produced between said matched gears.

3. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, said spring means comprising a plurality of springs having different characteristics, said springs disposed outwardly of said matched gears, said projections disposed outwardly of said second gear, said spring means and said projections being thus accessibly disposed for purposes of engagement, disengagement and adjustment wherein means is provided to effect said engagement and disengagement in entirety and in part and said adjustment, prior to and after enmeshment of said antibacklash gear assembly with another gear.

4. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, said spring means comprising springs of different sizes, said springs engageable with said projections singly or in combination providing therein means to effect change to said torque between said matched gears.

5. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, said spring means comprising springs having different characteristics, said springs fixedly secured at one end thereof to said hub, said projections fixedly secured at one end thereof to said second gear, said spring means and said projections by virtue of said securement adaptable to be engaged, disengaged and adjusted precluding the need therein to disconnect said springs and said projections from said antibacklash gear assembly, and precluding the need to disassemble said antibacklash gear.

6. An antibacklash gear assembly comprising matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs having different characteristics cooperable with said projections and said hub to produce a torque between said matched gears, said cantilever springs radiating outward from said hub normal to said common axis of said matched gears, said projections from the face of said second gear extending outward therefrom parallel to said common axis whereby said springs in said cooperation with said projections engage said projections normal thereto.

7. An antibacklash gear assembly as claimed in claim 6 wherein said cantilever springs and said pin projections have circular cross section.

8. An antibacklash gear assembly as claimed in claim 6 wherein said cantilever springs radiate from said hub substantially in one plane normal to said common axis of said matched gears.

9. An antibacklash gear assembly as claimed in claim 6 wherein said cantilever springs radiate from said hub in a plurality of planes substantially normal to said common axis of said matched gears.

10. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs accessibly disposed at one end thereof cooperable with said projections and said hub to produce a torque between said matched gears, said springs having different characteristics, means after enmeshment of said antibacklash gear assembly with another gear to effect engagement and disengagement of said springs with said projections, said means residing in adaptability of said springs at said accessibly disposed ends thereof to forcible deflection beyond the elastic limit thereof wherein said springs are forced into engagement, and out of engagement with said projections, means further by virtue of said adaptability to effect change in said torque produced between said matched gears, said means residing in the forcible deflection of said springs beyond their elastic limit wherein the force exerted by said springs, in cooperation with said projections is changed thereby.

11. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said springs arranged around said hub in pairs each pair having size and spring rate different from another pair, each spring of each pair substantially oppositely disposed around said hub.

12. An antibacklash gear assembly comprising two matched gears, a first gear and a second gear, said gears positioned one adjacent the other face-to-face on a hub and having a common axis therewith, said matched gears adaptable to simultaneous enmeshment with a third gear, said hub having cylindrical configuration stepped portions at one end thereof cylindrical in form and concentric with said axis, means to adapt and secure said hub to a shaft for rotation therewith, said first gear having a hole through its center, said gear mounted through said hole to said hub at the first of said stepped portions thereof and fixedly secured thereto, said second gear having a hole through its center, said gear rotatably mounted through said hole to said hub at the second of said stepped portions thereof and secured from axial movement thereon, pins projecting from the face of said second gear, cantiveler springs of wire having different characteristics radiating from said hub, said springs cooperable with said pins to produce a torque mutually opposed between said matched gears, means in said cooperation to effect engagement and disengagement and adjustment of said springs and said pins independently.

13. An antibacklash gear assembly as claimed in claim 12 wherein said second gear of said matched gears contains a plurality of threaded holes at various locations in the face thereof, said pins at one end having screw means adaptable to insertion, removal and relocation in said holes whereby means is provided, in engagement of said pins and said springs, to effect changes to said torque between said matched gears in both magnitude and direction thereof.

14. An antibacklash gear assembly as claimed in claim 12 wherein said second gear of said matched gears is secured from axial movement on said hub by said second stepped portion and by a retaining ring affixed to said hub, and wherein said springs reside between said matched gears.

15. An antibacklash gear assembly as claimed in claim 12 wherein said pins projecting from said second gear are cylindrical in form, being both fixedly secured to said second gear, and slidably adjustable thereon, said projections slidably adjustable thereon secured through elongated slots in the face of said second gear.

16. An antibacklash gear assembly as claimed in claim 12 wherein said pins project from the second of said matched gears through openings in the face of said first gear and wherein said springs, in said cooperation with said pins, engage said pins on the exposed, accessible side of said first of said matched gears.

17. An antibacklash gear assembly as claimed in claim 1 wherein said hub comprises a plurality of separable members, a first member supporting said matched gears, a second member supporting said spring means, and means to fixedly secure said members together.

18. An antibacklash gear assembly as claimed in claim 1 wherein said hub comprises a plurality of members, a first member and a second member, said second hub member supporting said spring means, and securing said second gear from axial movement on said first hub member, screw means fixedly securing together said hub members and fixedly securing said antibacklash gear assembly to said shaft for rotation therewith.

19. An antibacklash gear assembly as claimed in claim 1 wherein said hub comprises a plurality of members, a first member supporting said matched gears and a second member supporting said spring means, means to orient angularly said second hub member relative to said first hub member and means to secure said members in said orientation.

20. An antibacklash gear assembly as claimed in claim 1 wherein said hub comprises a plurality of members, a first member supporting said matched gears and a second member supporting said spring means, said second member accessibly disposed at one end of said gear.

21. An antibacklash gear assembly as claimed in claim 1 wherein said hub comprises a plurality of members, a first member supporting said matched gears, and a second member supporting said spring means, said second member secured to said first member between said matched gears.

22. An antibacklash gear assembly comprising two matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, movable projections extending from the face of said second gear, cantilever springs radiating from said hub, engageable with said projections to produce an opposing torque between said matched gears, said springs having different characteristics, means to secure and to remove said springs from said hub, means by virtue of said movable projections to engage, disengage and adjust said springs therewith, prior to and after enmeshment of said antibacklash gear assembly with another gear, as when said antibacklash gear assembly is interposed in a train, said means precluding the need therein to disconnect said springs and said projections from said antibacklash gear assembly, and to disassemble said antibacklash gear assembly.

23. An antibacklash gear assembly as claimed in claim 22 wherein said movable projections on said second gear of said matched gears are adjustable in the tangential direction thereon.

24. An antibacklash gear assembly as claimed in claim 22 wherein said movable projections on said second gear of said matched gears are adjustable in the tangential direction and the radial direction thereon.

25. An antibacklash gear assembly as claimed in claim 22 wherein said movable projections on said second gear of said matched gears are adjustable in the radial direction thereon.

26. An antibacklash gear assembly as claimed in claim 22 wherein said movable projections on said second gear of said matched gears are adjustable simultaneously in the tangential and radial directions thereon.

27. An antibacklash gear assembly as claimed in claim 22 wherein said movable projections on said second gear of said matched gears are slidably adjustable thereon.

28. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub, and secured from axial movement thereon, projections extending from the face of said second gear, spring means cooperable with said projections and said hub to produce a torque between said matched gears, said spring means comprising a plurality of springs having different characteristics, said projections and said spring means accessibly disposed wherein said spring means, said first gear and said second gear are arranged on said hub in the following order; said spring means, said second gear, and said first gear.

29. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub, and secured from axial movement thereon, projections extending from the face of said second gear, spring means cooperable with said projections and said hub to produce a torque between said matched gears, said projections and said spring means accessibly disposed wherein said spring means, said first gear and said second gear are arranged on said hub in the following order; said spring means, said first gear, and said second gear.

30. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub, and secured from axial movement thereon, projections extending from the face of said second gear, spring means cooperable with said projections and said hub to produce a torque between said matched gears, said spring means comprising a plurality of springs having different characteristics, said projections and said spring means accessibly disposed for purposes of engagement and disengagement therewith wherein said spring means, said first gear and said second gear are arranged on said hub in the following order; said second gear, said spring means, and said first gear.

31. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub, and secured from axial movement thereon, projections extending from the face of said second gear, spring means cooperable with said projections and said hub to produce a torque between said matched gears, said spring means comprising a plurality of springs having different characteristics, said projections and said spring means accessibly disposed and inaccessibly disposed for purposes of engagement and disengagement therewith wherein said spring means, said first gear and said second gear are arranged on said hub in the following order; said second gear, said spring means, and said first gear.

32. An antibacklash gear assembly comprising a plurality of matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub, and secured from axial movement thereon, projections extending from the face of said second gear, cantilever springs secured at one end thereof to said hub engageable with said projections to produce an opposing torque between said matched gears, said spring means comprising a plurality of springs having different characteristics, said springs engageable with said projections substantially at one end thereof wherein means is provided to effect engagement and disengagement of said springs and said projections, said means residing in the adaptability of said springs to deflection around the ends of said projections from one side thereof to the opposite side.

33. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said springs and said projections angularly displaced around the axis of said antibacklash gear at intervals substantially corresponding, said projections adaptable by screw means to change of position wherein means is provided to effect engagement of said springs and said projections in various order and in various combinations.

34. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said springs and said projections angularly displaced around the axis of said antibacklash gear assembly at intervals closely but not exactly corresponding wherein means is provided to effect engagement of said springs and said projections in series.

35. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said springs having different characteristics, said springs and said projections angularly displaced around the axis of said antibacklash gear assembly at corresponding intervals wherein means is provided to effect engagement of all springs and all projections simultaneously and wherein means is provided to effect disengagement of said springs in various order.

36. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, said spring means comprising a plurality of springs removable and replaceable as a unit from said antibacklash gear assembly.

37. An antibacklash gear assembly as claimed in claim 36 wherein said spring means is accessibly disposed outwardly of said matched gears that by virtue thereof means is provided to effect said removal and replacement of said spring means after assembly of said antibacklash gear assembly with another gear.

38. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said springs securable and removable from said hub as a unit, said springs and said projections angularly disposed around said axis of said antibacklash gear assembly at intervals substantially corresponding wherein means is provided to engage, disengage, and adjust in unison said springs in cooperation with said projections, and wherein means is provided to disassemble in unison said springs from said antibacklash gear assembly, and wherein mean is provided to effect simultaneous replacement of said springs with similar springs cooperable with said projections.

39. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said projections notched at one end thereof at points where, in said cooperation of said springs and said projections, said springs engage said projections providing thereby a means to sustain said springs in fixed alignment with said projections.

40. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, projections extending from the face of said second gear, cantilever springs cooperable with said projections and said hub to produce a torque between said matched gears, said projections having division at one end thereof, said springs, in said cooperation with said projections, coacting therewith internally and between said division wherein means is provided to produce said torque in the clockwise direction, and in the counterclockwise direction respecting each of said matched gears.

41. An antibacklash gear assembly as claimed in claim 40 wherein said projections having division at one end thereof are adjustable on said second gear.

42. An antibacklash gear assembly comprising a plurality of matched gears, a first gear and a second gear, said gears positioned one adjacent the other face-to-face on a hub and having a common axis, means to adapt and secure said hub to a shaft for rotation therewith, said first gear fixedly secured to said hub, said second gear rotatably mounted on said hub and secured from axial movement thereon, removable projections extending from the face of said second gear, cantilever springs cooperable with said projections and said hub to produce a torque between said matched gears, screws means securing said projections at one end thereof to said second gear, friction means to adjust and secure in adjustment said projections on said second gear, said projections at the opposite end thereof cooperable with said springs, said opposite end eccentric with said secured end wherein means is provided, in said adjustment, to achieve and sustain effectively cam action against said springs providing therein means to change said torque between said matched gears.

43. An antibacklash gear assembly comprising two matched gears, a first gear and a second gear, said gears positioned one adjacent the other face-to-face on a hub, and having a common axis, means to adapt and secure said hub to a shaft for rotation therewith, said first gear fixedly secured to said hub, said second gear rotatably mounted on said hub and secured from axial movement thereon, projections extending from the face of said second gear, spring means cooperable with said projections and said hub to produce a torque between said matched gears, cam means in said projections, means to orient angularly said projections on said second gear and means to sustain said projections in said orientation.

References Cited in the file of this patent

UNITED STATES PATENTS

| | | |
|---|---|---|
| 1,486,423 | Ericson | Mar. 11, 1924 |
| 2,607,238 | English et al. | Aug. 19, 1952 |
| 2,663,198 | Cairnes | Dec. 22, 1953 |

FOREIGN PATENTS

| | | |
|---|---|---|
| 278,793 | Great Britain | Oct. 10, 1927 |
| 979,448 | France | Apr. 26, 1951 |